United States Patent [19]

Horton

[11] Patent Number: 5,372,248

[45] Date of Patent: Dec. 13, 1994

[54] RADIUS CONVEYOR BELT

[75] Inventor: Paul L. Horton, Metairie, La.

[73] Assignee: The Laitram Corporation, Harahan, La.

[21] Appl. No.: 184,501

[22] Filed: Jan. 18, 1994

[51] Int. Cl.$^5$ .............................................. B65G 17/06
[52] U.S. Cl. ...................................... 198/852; 198/834
[58] Field of Search ................ 198/831, 834, 852, 853

[56] References Cited

U.S. PATENT DOCUMENTS

| | | | |
|---|---|---|---|
| 3,870,141 | 3/1975 | Lapeyre et al. | 198/193 |
| 4,222,483 | 9/1980 | Wootton et al. | 198/831 |
| 4,742,907 | 5/1988 | Palmaer | 198/831 |
| 4,901,844 | 2/1990 | Palmaer et al. | 198/778 |
| 4,934,517 | 6/1990 | Lapeyre | 198/852 |
| 5,031,757 | 7/1991 | Draebel et al. | 198/852 |
| 5,069,330 | 12/1991 | Palmaer et al. | 198/778 |
| 5,133,449 | 7/1992 | Spangler | 198/778 |
| 5,139,135 | 8/1992 | Irwin et al. | 198/852 |
| 5,141,099 | 8/1992 | Baumgartner | 198/778 |
| 5,156,262 | 10/1992 | Horton | 198/834 |
| 5,156,264 | 10/1992 | Lapeyre | 198/852 |
| 5,174,439 | 12/1992 | Spangler et al. | 198/852 |
| 5,181,601 | 1/1993 | Palmaer et al. | 198/831 |
| 5,253,749 | 10/1993 | Ensch | 198/853 |
| 5,271,491 | 12/1993 | Irwin | 198/778 |
| 5,332,084 | 7/1994 | Greve | 198/853 |

OTHER PUBLICATIONS

"KVP 1" and 1½ Pitch Non-Metallic Chain" Brochure, KVP Corp., pp. 5-6, Bulletin No. 5-6/4-76, 1976.

Primary Examiner—Joseph E. Valenza
Attorney, Agent, or Firm—James T. Cronvich

[57] ABSTRACT

A modular plastic conveyor belt formed of rows of plastic belt modules pivotally interlinked by transverse pivot rods and specially adapted for following a curving conveyor path. The modules include a top, product-conveying surface and a bottom, sprocket-driven surface. A central elongate element extends across the width of each module transverse to the direction of belt travel. The elongate element is formed by a thin, corrugated strip forming a series of regularly spaced alternating grooves and ridges. Link ends extend outward from the ridges on each side of the corrugated strip. Each link end has a thick portion at the end of the link end distant from the corrugated strip. Transverse holes in the link ends are aligned to accommodate a pivot rod. When the link ends of consecutive rows of side-by-side modules are intercalated, the pivot rod serves as a hinge pin in a hinged joint between consecutive interlinked rows. To permit the belt to flex sidewise, the holes in the link ends extending from one side of the corrugated strip are slotted longitudinally in the direction of belt travel. The thick end portions of the link ends include a chamfered surface for engagement by the tooth of a rotating sprocket. The outer edges of the belt are formed by edge modules characterized by an outer sidewall having a cylindrical groove terminating in an angled occlusion to confine headless pivot rods in position between adjacent belt rows. Other versions of the belt are constructed with various edge modules, each including provisions for preventing the belt from rising up out of a conveyor tray as the belt rounds a turn. Various edge modules include one or more integral projections extending outward from a sidewall for engaging a conveyor side rail or tabbed projections extending downward from the bottom surface of the module for engaging support surfaces beneath the conveyor carryway.

16 Claims, 6 Drawing Sheets

RADIUS CONVEYOR BELT

BACKGROUND

This invention relates to conveyor belts and, more particularly, to modular plastic conveyor belts formed of rows of plastic belt modules pivotally interlinked by transverse pivot rods.

Because they do not corrode and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are intercalated with the link ends of an adjacent row. A pivot rod journalled in the aligned apertures of the side-by-side and end-to-end connected modules forms a hinge between adjacent rows. Rows of belt modules are connected together to form an endless conveyor belt capable of articulating about a drive sprocket.

In many industrial applications, conveyor belts are used to carry products along paths including curved segments. Belts capable of flexing sidewise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

The requirement of following a curved path causes problems not found in straight-running belts. As one example, radius belts, especially if tightly tensioned or running fast and lightly loaded, tend to rise out of the conveyor carryway around a turn. As another example, because belt pull is concentrated in the outer portion of the belt as it rounds a turn, outer link ends are more likely to fail unless otherwise strengthened or bolstered.

One modular plastic radius belt design is shown in U.S. Pat. Nos. 4,742,907 and 5,181,601. Various versions of the design include: a) integral guides depending from the belt and engaging a lateral surface of a supporting wearstrip at the outside of a turn to guide the belt around the turn; b) holddown tabs extending from the guides to hold the belt down as it rounds turns; c) heavy integral sideplates at the belt edge to withstand the increased stress experienced by the edge of the belt at the outside of a turn; and d) special high-strength, press-fit pivot rods.

Another modular plastic radius belt having internal modules with link ends of varying shapes is described in U.S. Pat. No. 5,174,439. The belt is driven off a curved drive bar central to each module. Special edge modules have closer link end spacing and tapered slots for pivot rods. Various rod retention schemes are shown, including plugging and press-fitting. Projections from the edge modules engage a side guide rail of the conveyor to prevent the belt from rising as it rounds a turn.

Conventional sprocket-driven conveyor belts include a drive surface engageable by the tooth of a sprocket about which the belt articulates. In many belts, such as the radius belts described in the previously mentioned patents, drive surfaces are formed along transverse elements disposed more or less midway between the link ends and connecting theta together. As a belt articulates about a sprocket, the teeth of the sprocket can rub against the drive surface as the tooth slides into and out of full engagement with the drive surface. This frictional rubbing, often referred to as scrubbing, causes wear on the drive surface and especially on the sprocket teeth. The problem of sprocket wear is often dodged through the use of beefy plastic sprockets or even metal sprockets.

Straight-running conveyor belts that are hinge-driven at a link end surface, rather than centrally driven along a surface between the link ends, are exemplified in U.S. Pat. Nos. 3,870,141 and 5,156,262. Neither belt, however, is capable of radius operation. The modules shown in the latter patent are hingedly interconnected by headless pivot rods. Belt edge structure can be flexed in and out of an occluding position restraining the pivot rod to permit its insertion or removal.

Because of the convenience of headless pivot rods, their use in conveyor belts is desirable. Many schemes for retaining headless rods include the use of retention clips that can be inserted and removed from a position occluding at least a portion of the aligned apertures. If such clips work their way out of their occluding position, they can contaminate the conveyed product or be lost. Other schemes for retaining headless rods are shown in U.S. Pat. No. 5,156,264. The techniques, however, require special rod treatment, such as tapering of the rod ends, or manual flexing of belt edge structure to admit the rod. Too much flexing of the belt edge structure can weaken the flexible joint.

There are other problems with some common belt designs. For example, stresses can be molded into the plastic modules during the molding process. Sharp, as opposed to curved, junctions between molded features on a belt module are more likely to form concentrated stress regions. When such modules make up a conveyor belt, operation of the belt increases the stress in those regions. In a radius belt, in which the pulling load is unevenly distributed across the width of the belt as it rounds a turn, the problem is exacerbated. One way to solve the problem is to add more material to the belt, but that makes the belt heavier and closes in some of the desirable open area that allows for drainage or air flow.

It is also advantageous to subject belt elements, especially protrusions such as link ends, to compressive rather than tensile forces, which tend to pull the elements apart. In the radius belts previously mentioned, consecutive link ends forming a pocket with the transverse drive element to accommodate a sprocket drive tooth are put in tension by the driving action of the tooth on the drive element.

Asymmetrical belts, especially belts having protrusions extending beyond the planes of the top and bottom belt surfaces, present handling problems. Such belts are not easy to roll up. Fewer linear feet of belt can be fit in a given box for shipment. The protrusions are more susceptible to damage, both during belt operation and in handling. An asymmetrical belt cannot be turned inside out (flipped top to bottom) to increase its useful life. Because asymmetrical belt modules are generally of a more irregular design, it is not so straightforward a process to cut them to specified widths for custom applications. Consequently, more molding tools are required and more module types must be kept in inventory.

SUMMARY

The foregoing shortcomings are avoided by the invention, which provides an endless conveyor belt formed of plastic belt modules and capable of following a curved path. The modules include first and second module surfaces, i.e., a top, product-conveying surface and a bottom, sprocket-driven surface. A central elongate element extends across the width of each module transverse to the direction of belt travel. The elongate element is formed by a thin, corrugated strip having a pair of essentially parallel walls. The corrugated strip forms a series of regularly spaced alternating grooves and ridges along each wall. Link ends extend outward from the ridges on each wall of the corrugated strip. Each link end has a leg portion attached at a ridge of the strip and a thick distal portion at the end of the link end distant from the corrugated strip. Transverse holes in the link ends extending from respective walls of a module are aligned to accommodate a pivot rod. When the link ends of consecutive rows of side-by-side modules are intercalated, the pivot rod serves as a hinge pin in a hinged joint between consecutive interlinked rows. To permit the belt to flex sidewise and follow a curved path, the holes in the link ends extending from one of the walls of the corrugated strip are slotted longitudinally in the direction of belt travel. Besides forming a strong, wear-resistant bearing surface at the pivot rod hole, the thick distal portions of the link ends include a chamfered surface intersecting the plane of the bottom surface of the module, preferably at an obtuse angle. The chamfered surface serves as a driving surface suitable for engagement by the tooth of a rotating sprocket. Such driving at a chamfered surface the hinge, instead of at a cylindrical surface near the middle of the module, lessens the scrubbing effect of the module on the sprocket, and vice versa. Furthermore, the link end engaged by the sprocket tooth is subjected to a compressive force rather than an undesirable tensile force. Thus, the link ends provide pull strength, resistance to belt and sprocket wear, and sprocket drivability. With similar chamfered surfaces on both sides of the link ends, a belt made up of such modules can be turned inside out without requiring further modification of the conveying system. The symmetry of the modules simplifies belt assembly.

Each wall of the corrugated strip forms a series of arched recesses with the leg portions of the link ends. The recesses are large enough to provide room for a thick link end of an interlinked module of an adjacent row to collapse into the recess or to rotate as belt rows fan out in going around a turn. Because the recesses along one wall overlap in a transverse direction the recesses along the other wall, additional space for collapsing is provided.

The outer edges of the belt are formed by edge modules characterized by an outer sidewall providing pivot rod retention. Interior to the outer sidewall is a link end portion, essentially a reduced-width link end having a transverse hole aligned with the holes of the link ends on that end of the module. Transverse connecting structure connects one end of the sidewall to the link end portion and forms a segment of a cylindrical groove along a surface of the connecting structure. The groove is aligned with the transverse holes and accommodates a pivot rod. An occlusion forming the outside end of the groove serves, along with the occlusion in the edge module at the other belt edge of the row, to confine the rod in the aligned set of holes. Thus, the belt is designed for use with headless rods that can be inserted and removed from either edge of the belt, a manufacturing and maintenance convenience.

Other versions of the belt of the invention include provisions for preventing the belt from rising up out of a conveyor tray as the belt rounds a turn. In one version, a projection extends outward from the sidewall of an edge module. The projection includes an upper surface that engages a conveyor side rail as the belt edge tends to rise as it rounds a turn. With the projection centrally disposed between the top and bottom surfaces of the belt, i.e., symmetrical about a plane parallel to and midway between the planes of the top and bottom surfaces, a belt including such edge modules can be reversed or run inside out. In another symmetrical version, a pair of projections separated by a longitudinal groove midway between the top and bottom surfaces extend from the sidewall of an edge model. A belt constructed with such edge modules can be operated in a variety of modes with a single conveyor configuration.

In another version of the belt of the invention, an integral projection extends from the belt edge structure of the edge modules downward from the driven surface. A tab that is parallel to the belt surfaces extends inwardly from the projection. The tab fits under the lip of a supporting wearstrip in the conveyor system. As the belt tends to rise, the tab catches on the lip of the wearstrip and prevents the belt from rising further. The tab is disposed between the edge of the belt and a guide depending from one of the link ends. The guide, which is substantially parallel to the integral projection, slides along a supporting wearstrip on the inside of a turn.

DRAWINGS

These and other features, aspects, and advantages of the invention will become better understood with reference to the following description, appended claims, and accompanying drawings in which:

DESCRIPTION

Figure 1:
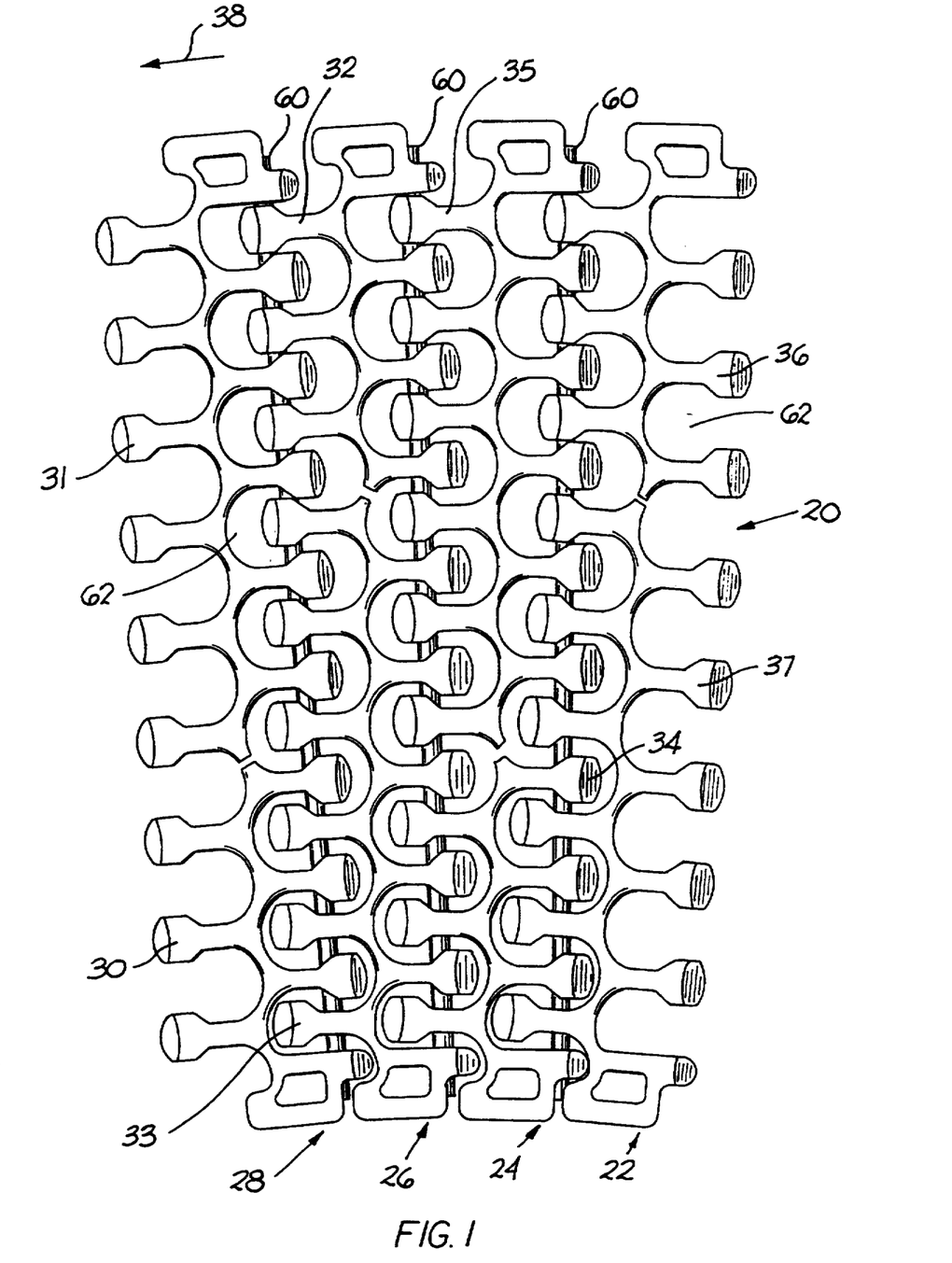
FIG. 1 is a plan view illustrating a portion of a modular conveyor belt according to the invention.

A portion of a modular plastic radius belt 20 according to the invention is shown in FIG. 1. A series of four rows 22, 24, 26, 28 are formed by pairs of side-by-side belt modules 30, 31; 32, 33; 34, 35; 36, 37. The modules 30–37 are laid out in a bricklaid pattern with no continuous longitudinal seams in the direction of belt travel, which is indicated by the arrow 38.

The features of the individual modules are also shown in FIGS. 2A–2D. Each module 31 includes a first group of link ends 44 extending outwardly from a first wall 46 of an elongate element 48 in the form of a corrugated strip disposed along the width of the module transverse to the direction of travel 38. The corrugated strip 48 forms a series of grooves 51 and ridges 52 along its first wall 46 and its second wall 47. A second group of link ends 45, offset transversely with respect to the first group 44, extend outwardly of the second wall 47. Dashed lines 50 in FIG. 2A define an imaginary interface between the first and second walls 46, 47 and the respective first and second groups of link rods 44, 45. The imaginary interface defines the ridges 52 along each wall 46, 47 of the corrugated strip 48.

The link ends 44, 45 include a leg portion 52, including a tapering base portion 54 that extends from the corrugated strip 48. The base portion 54 tapers to form a smooth curve with the wall 46, 47 from which it extends, as opposed to the stress-concentrating right-angle junctions formed between the elements of many other belt module designs. The link ends 44, 45 terminate at their ends in distal end portions 56. The distal end portions 56 are generally thicker than the leg portions 52. The end portions 56 and the leg portions 52 are joined by a tapered intermediate portion 58. The corrugated strip 48 and link ends 44, 45 extend in depth from a first slightly crowned upper product-conveying surface 62 defining a first plane to a second slightly crowned lower belt-driving surface 64 defining a second substantially parallel plane. A cylindrical transverse hole 40 is formed in each of the first set of link ends 44. The transverse holes 40 of each of the link ends of the first set 44 are aligned. The aligned transverse holes 42 of the second set of link ends are slotted longitudinally in the direction of belt travel 38.

As shown in FIG. 1, the first set of link ends 44 of one row 22 of modules are intercalated with the second set of offset link ends 45 of an adjacent row 24 of modules with the respective holes 40, 42 aligned. A pivot rod 60 is journalled in the aligned holes across the width of the belt 20 and serves as a hinge pin in the hinged joint formed at the intercalated link ends. The hinged joint allows a belt to articulate about a drive sprocket or idler roller. Consecutive pairs of adjacent rows 24 to 26, 26 to 28, and so on, are singularly interconnected by pivot rods 60 into an endless belt.

The ability of the belt section 20 to fan out as it rounds a turn is also shown in FIG. 1. The edges of the modules 30, 33, 34, 37 at the inside of a turn collapse together in a turn. The edges of the modules 31, 32, 35, 36 at the outside of a turn spread out. The slotted rod holes 44 at each hinged joint allow the rows to collapse and spread as required. The corrugated shape of the elongate element 48 forms with the leg portions 52 of consecutive link ends 44, 45 a series of arch-shaped recesses 62 between consecutive link ends. Each recess 62 is dimensioned to accommodate an intercalated link end of an adjacent row. The corrugated structure of the elongate element 48 allows the recesses 62 to extend to or even beyond a plane midway between the first and the second sets of link ends 44, 45. Thus, the recesses 62 provide the link ends with sufficient freedom of movement to allow the modules at the inside of a turn to collapse.

Figure 3:
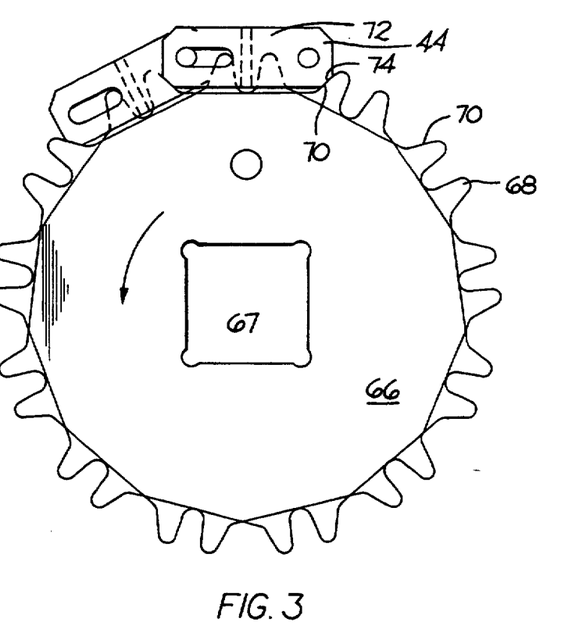
FIG. 3 is a cross-sectional side elevational view showing a pair of belt rows made up of the modules of FIGS. 2A–D engaged by a drive sprocket.

The engagement of the belt of the invention with a drive sprocket is shown in FIG. 3. A drive sprocket 66 rotated on a motor-driven shaft (not shown) through a bore 67 has teeth 68, each tooth having a flat drive surface 70. The teeth 68 are spaced around the periphery of the sprocket 66 to match the pitch of the belt. As a belt row 72 is pulled into position for engagement with the sprocket tooth 68, the matching slopes of the drive surface 70 of the tooth 68 and the chamfered surface 74 at the distal portion 56 of the link end 44 meet without scrubbing. Unlike radius belts driven off a drive bar having drive surfaces close to vertical and susceptible to scrubbing, the belt shown in the drawings has a driving surface 74 well off vertical.

The chamfered drive surface 74 is formed on the thick distal portion 56 of the link end 44 and makes an obtuse angle 76 with the bottom surface 64 of the belt. Preferably, similar chamfered surfaces 74 can be formed on the top and bottom sides of each link end 44, 45. In this way, the modules can be driven in either direction and the belt can even be rearranged inside out on the conveyor to extend its useful life. It should also be noticed that the link end being driven by the sprocket tooth 68 is pushed forward in compression rather than pulled in tension from a central drive bar as in other radius belts, thereby operating in a more favorable fashion.

The outer edge of the belt module 31 is shown in FIGS. 2A–D. The edge is formed by an outer sidewall 78 forming a flat surface. Interior to the sidewall 78 is a link end portion 80 having a transverse hole 82 aligned with the holes 40 of the first set of link ends 44. The distal end 84 extends longitudinally as far as the first set of link ends 44. Transverse connecting structure 86 joins one end of the sidewall 78 to the link end portion 80 in the vicinity of the hole 82. The other end of the sidewall 78 is joined to the elongate element 48. A groove 88 in an outer surface of the transverse connecting structure 86 is in the form of a partial cylinder continuous with the hole 82 in the link end portion 80. The groove terminates in an angled occlusion 90. The occlusion 90 serves, along with the similar occlusion at the other edge of the belt row, to confine a headless pivot rod 60 journalled in the aligned holes 40, 44 and the grooves 88. The angled surface of the occlusion 90 helps guide a flexible pivot rod 60 into position during belt assembly and insure repeatable removal force irrespective of the shape of the pivot rod end.

A similar groove 92 formed in the junction between the other end of the sidewall 78 and the elongate element 48 is aligned with the end of the slotted transverse holes 42 in the leg portion 52 of the link ends 45. The groove 92 provides a recess for the end of the pivot rod 60 as the belt collapses. Because the pivot rod 60 is not held in journalled relationship by the sidewall 78, no tensile forces due to belt pull, which are especially high in the outside of a turn, are applied to the sidewall. Instead, the forces are distributed away from the edge of the belt along the link ends 44, 45 and the link end portions 80.

Figure 2A:
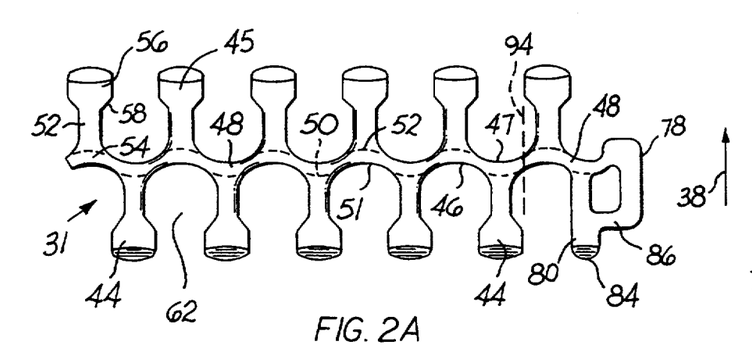
FIGS. 2A–D are respectively plan, front, side, and perspective views of an edge module used to construct a conveyor belt as in FIG. 1.
Figure 2B:
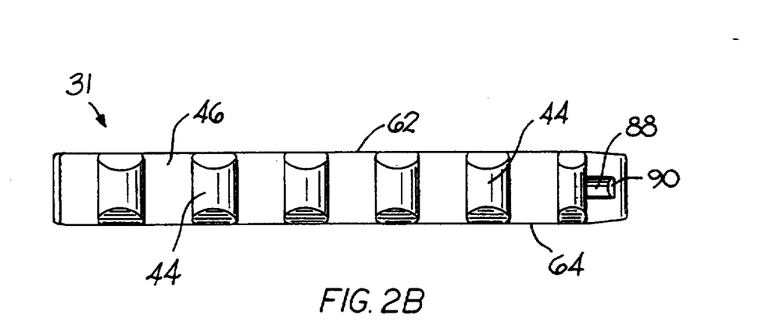
Figure 2C:
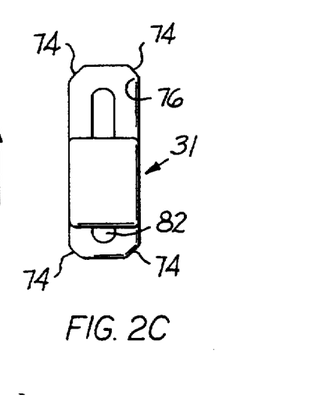
Figure 2D:
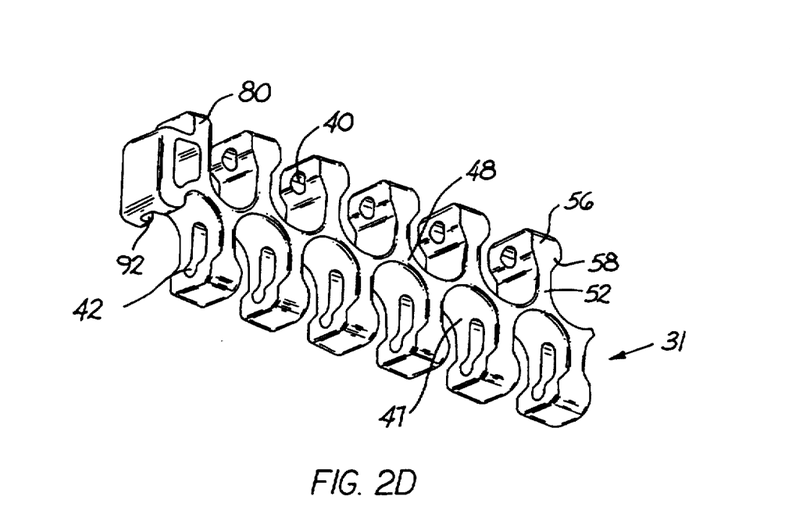
Figure 4:
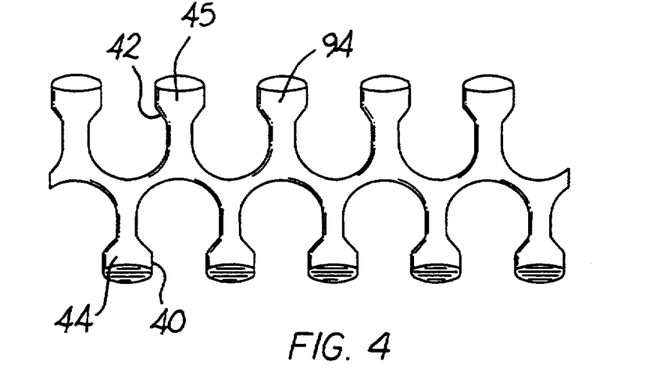
FIG. 4 is a plan view of an interior belt module in accordance with the invention.

Wide belts can be formed by adding more or wider internal belt modules 94, such as that depicted in FIG. 4. The internal module 94 lacks the belt edge structure of FIGS. 2A–D, but can be bricklaid with various widths of other of such modules and with edge modules to form a belt of almost any width. The internal module 94 can be molded without the edge portion or can be cut from a belt-edge module 31 along, for example, a line 94 as shown in FIG. 2A. The internal module 94 is reversible top-to-bottom and, except for the different rod hole 40, 42 dimensions in the opposite set of link ends 44, 45, end-to-end reversible.

Figure 5:
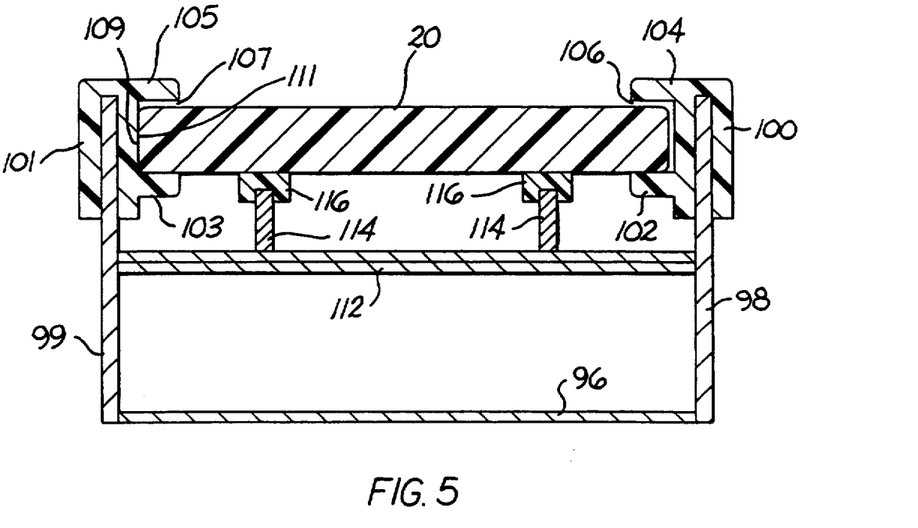
FIG. 5 is a cross-sectional end-on representation of the belt of FIG. 1 in the turn of a conveyor system.
Figure 6A:
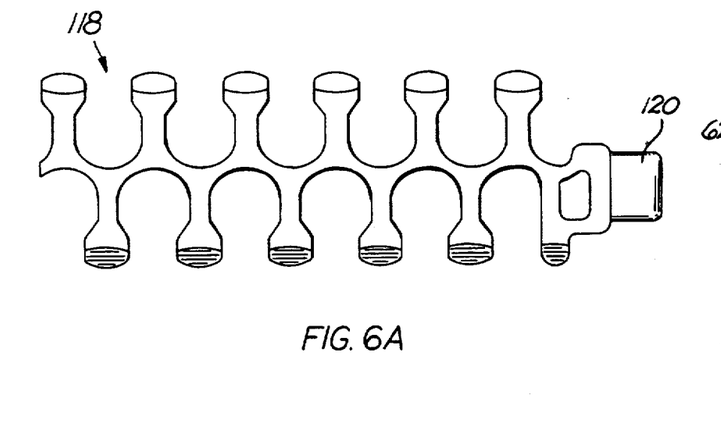
FIGS. 6A–D are respectively plan, front, edge, and perspective views of another version of edge module for use in constructing radius belts in accordance with the invention.
Figure 6B:
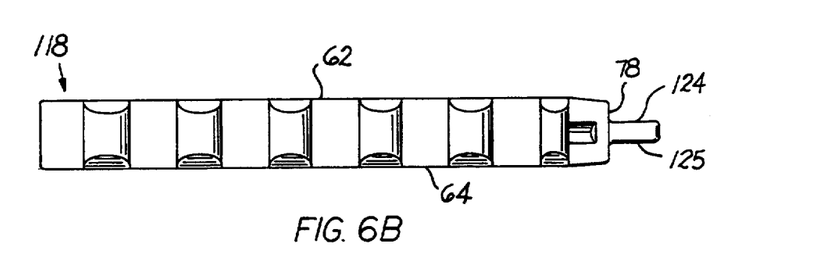
Figure 6C:
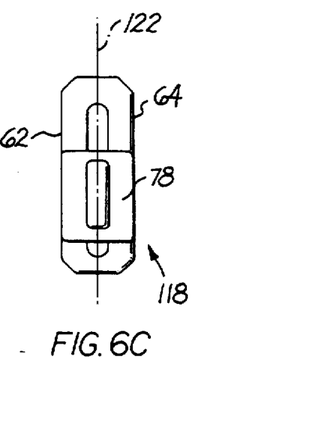
Figure 6D:
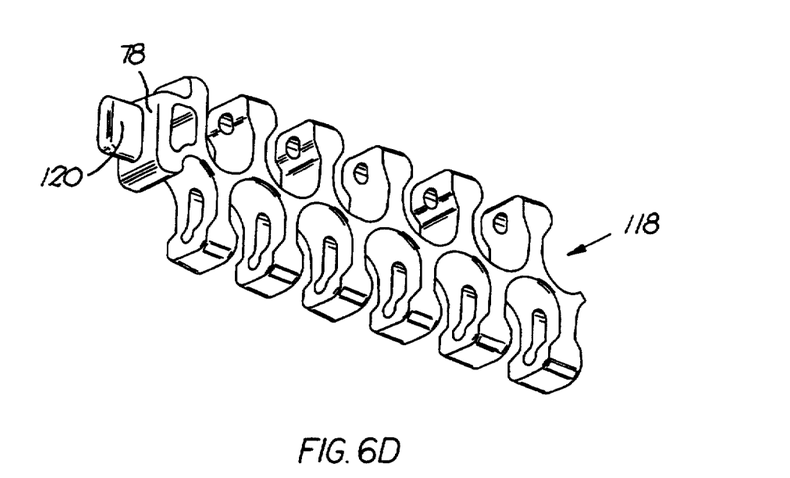

It is necessary that a conveyor system include provisions for guiding a radius belt around turns. FIG. 5 is a cross-sectional end-on elevational representation of the carryway half of a conveyor system utilizing a belt such as that of FIG. 1. The belt 20 has a substantially rectangular end-on profile. The conveyor system includes a frame 96 having a pair of side supports 98, 99, which support respective side rails 100, 101. The side rails 100, 101, which are constructed of a durable, low-friction plastic material, include inwardly projecting support flanges 102, 103 for supporting the belt 20. Holddown flanges 104, 105 extend over the edge of the belt 20 and prevent it from rising as it rounds a turn. The holddown and support flanges form guide channels 106, 107 for guiding the belt 20 around a turn. As the belt makes a turn, its sidewall 111 at the inside of the turn is in sliding contact with the vertical surface 109 of the inside side rail 101. A cross member 112 attached to the side supports 98, 99 may have a number of wearstrip rails constructed of a support rail 114 for a wearstrip 116. Such additional support is required only for heavy product loads or for wide belt widths.

Figure 7:
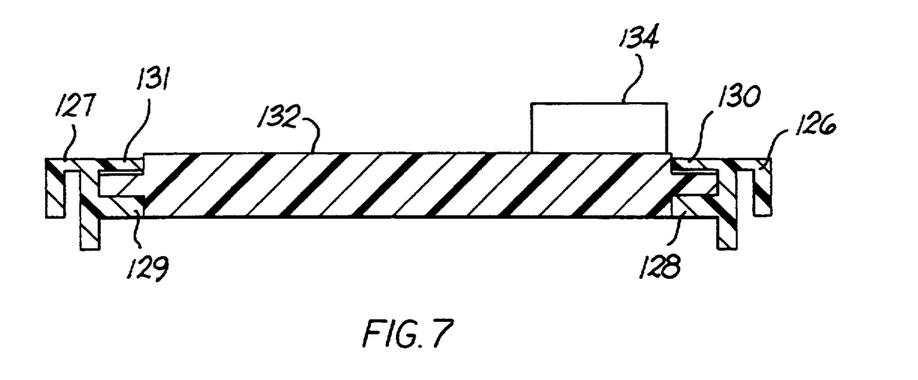
FIG. 7 is a cross-sectional end-on representation of a belt constructed with the edge modules of FIGS. 6A–D operating in the turn of a conveyor frame.

Another version of the belt 20 of FIG. 1 can be constructed by substituting the edge module 118 of FIGS. 6A–D. In this version, a projection 120 extends from the sidewall 78. The projection 120 is symmetrical about a long axis 122 lying in a plane halfway between the planes of the top and bottom surfaces 62, 64 of the module 118. Thus, the module 118 is top-to-bottom reversible. The projection 120 has first and second guide surfaces 124, 125 that are used to guide a belt constructed with such edge modules and to hold it down around turns. As shown in FIG. 7, a belt 126 having the edge modules of FIGS. 6A–6D can be used with right and left conveyor side rails 126, 127 having inwardly extending support flanges 128, 129 and holddown flanges 130, 131. The conveyor side rail construction of FIG. 7 permits all of the conveying surface 132 to be used for transporting products 134, even out to the edge of the belt.

Figure 8A:
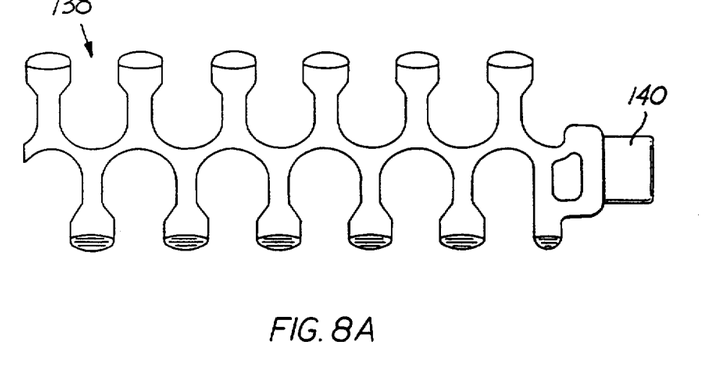
FIGS. 8A–C are respectively plan, front, and edge views of yet another version of edge module in accordance with the invention.
Figure 8B:
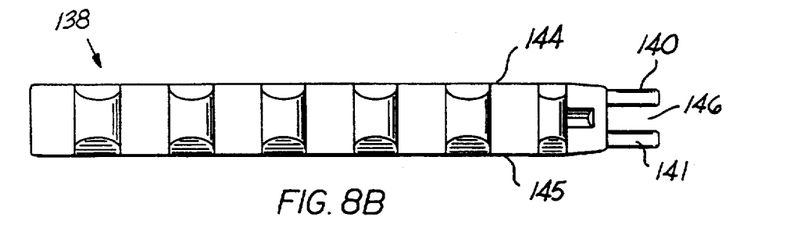
Figure 8C:
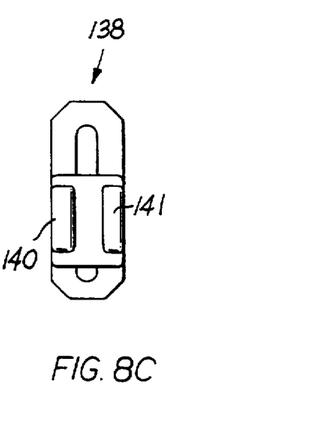
Figure 9:
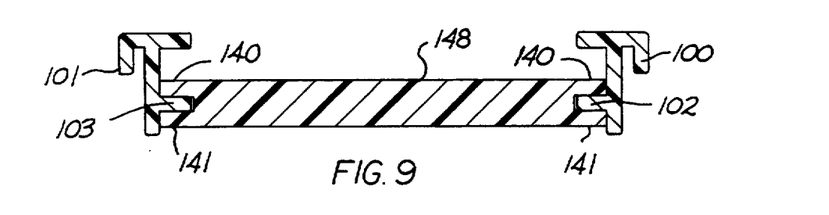
FIGS. 9A–C are cross-sectional end-on representations of three different modes for operating a conveyor belt constructed with the edge modules of FIGS. 8A–C.
Figure 9B:
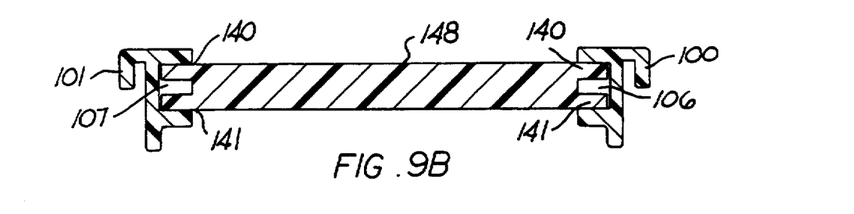
Figure 9C:
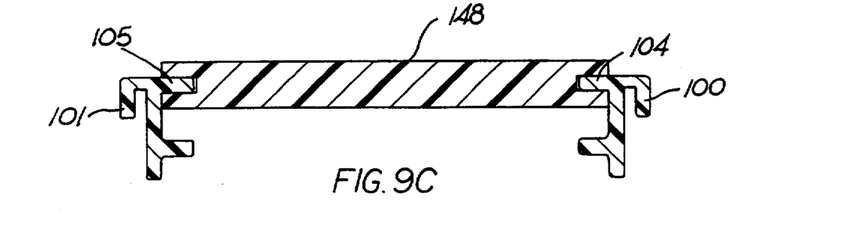

Another edge module version is shown in FIGS. 8A–C. In this version, the edge module 138 has first and second projections 140, 141 extending from the sidewall 142. The projections 140, 141 each have one surface continuous with the top and bottom surfaces 144, 145. A groove 146 is formed between the projections 140, 141. As shown in FIGS. 9A–9C, the conveyor side rails 100, 101 of FIG. 5 can be used with a belt 148 constructed with the edge modules 138 of FIGS. 8A–C. The projections 140, 141 can straddle the support flanges 102, 103 as shown in FIG. 9A. In this version, the support flanges 102, 103 serve both to support and to hold down the belt 148 as it rounds a turn. In FIG. 9C, the holddown flanges 104, 105 are used in the same way as the support flanges 102, 103 are used in FIG. 9A. In FIG. 9B, the projections 140, 141 protrude in the guide channels 106, 107 so that the belt 148 is guided through turns in the manner of the belt of FIG. 5. The versatility of the belt allows it to be operated with a single side rail configuration in three ways ranging from maximum conveying surface obstruction and product side-containment (FIG. 9A) to minimum belt surface obstruction and product side-containment (FIG. 9C).

Figure 10A:
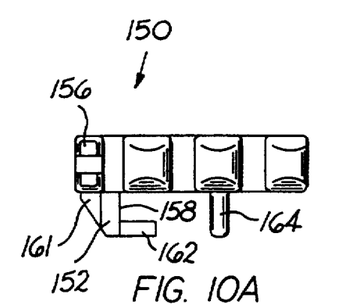
FIGS. 10A–B are respectively front elevational and perspective views of another version of edge module used to construct a conveyor belt according to the invention.
Figure 10B:
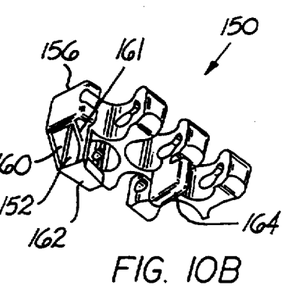
Figure 11:
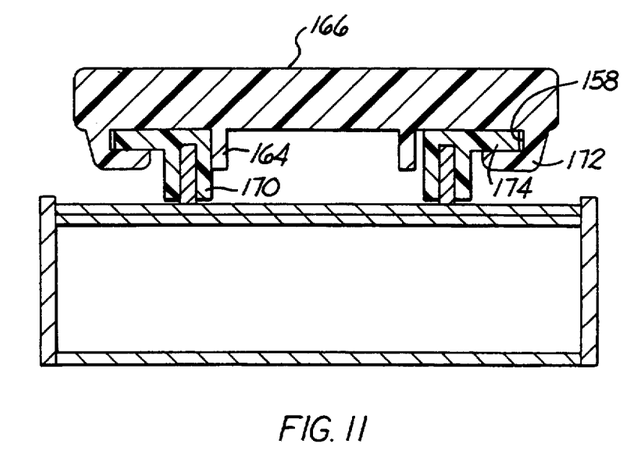
FIG. 11 is a cross-sectional end-on representation of a belt constructed with the edge modules of FIGS. 10A–B in the turn of a conveyor system.

Another edge module 150 is shown in FIGS. 10A–B. The edge module 150 has an integral projection 152 depending from the underside surface 154 of the edge structure 156 of the module. The projection 152 includes a longitudinal planar surface 158 extending from the edge structure 156 downward from the belt underside 154. A pair of flanking triangular webbed struts 160, 161 buttress the planar surface 158 to the edge structure 156. A transverse holddown tab 162 extends horizontally inwardly from the end of the planar surface 158. The edge module 150 further has a vertical guide tab 164 disposed inwardly of the holddown projection 152 and extending from the underside surface 154. The vertical guide tab 164 is essentially a parallelepiped. As shown in FIG. 11, a belt 166 constructed with the edge modules 150 of FIG. 10 is guided around a turn by the sliding engagement of the guide tab with the wearstrip 170 at the inside of a turn. The holddown tab 172 at the outside of the turn prevents the belt 166 from rising by catching on the lip of the outside wearstrip 174. If the guide tab 164 is eliminated, the planar surface 158 of the projection 152 contacts the side of the wearstrip 174 in the turn. Although a belt having this version of edge module cannot be flipped top-to-bottom, no conveyor side rails are required. As a consequence, it can be operated side-by-side with other similarly supported belts.

Although the invention has been described in detail with reference to certain preferred versions, other versions are possible. Therefore, the spirit and scope of the appended claims should not be limited to the description of the preferred versions contained herein.

What is claimed is:

1. A conveyor belt comprising plastic belt modules interlinked by pivot rods into a sequence of adjacent hinged rows of modules driven by a sprocket for conveying product in a direction of travel that may include a curved path, each of the belt modules comprising:
   a) first and second module surfaces defining planes substantially parallel to the direction of travel;
   b) an elongate element comprising a corrugated strip disposed across the width of the module transverse to the direction of travel and between the first and second module surfaces, the corrugated strip having opposing first and second walls forming a series of regularly spaced ridges and grooves across the width of the module;
   c) a first plurality of link ends extending outwardly from the ridges on the first wall of the corrugated strip in the direction of travel;
   d) a second plurality of link ends extending outwardly from the ridges on the opposing second wall of the corrugated strip in the opposite direction;
   e) each link end including a leg portion extending from the ridges along the direction of travel and a distal portion forming an end of the link end, the distal portion including a chamfered surface intersecting the plane of the second surface and suitable for driving engagement by a mating drive sprocket, each link end having a transverse hole aligned with the holes of the link ends extending from the same wall of the corrugated strip;

f) the transverse holes of the second plurality of link ends being slotted in the direction of travel; and g) the modules being interlinked by pivot rods journalled in the aligned transverse holes of intercalated link ends of the modules of adjacent hinged rows to form a conveyor belt capable of following a curved path.

2. The conveyor belt of claim 1, wherein the elongate element is disposed substantially midway between the first and the second plurality of link ends of each module and wherein the first and second walls of the corrugated strip form a series of arch-shaped recesses with the leg portions of consecutive link ends, the arch-shaped recesses being of sufficient transverse dimension to accommodate the intercalated link ends of interlinked modules.

3. The conveyor belt of claim 2, wherein the arch-shaped recesses formed along the first wall of the corrugated strip overlap in the transverse direction the recesses formed along the second wall.

4. The conveyor belt of claim 1, wherein the chamfered surface at the distal portion of the link ends forms an obtuse angle with the second surface of the module.

5. The conveyor belt of claim 1, wherein a module at an outer edge of the belt comprises integral belt edge structure having an interior link end portion and an outer sidewall forming the outer edge of the belt, the link end portion having a transverse hole aligned with the transverse holes of the first plurality of link ends of the module and journalling a pivot rod, the sidewall connected to the link end portion by transverse connecting structure forming a segmental cylindrical groove aligned with the transverse hole, the connecting structure including an occluding surface at the sidewall end of the groove to confine a headless pivot rod extending along the groove.

6. The conveyor belt of claim 1, wherein a module at an outer edge of the belt comprises belt edge structure including an integral sidewall forming a belt edge surface and further comprises an integral projection extending transversely outwardly from the sidewall, the integral projection being symmetrical about a plane parallel to and midway between the planes defined by the first and second module surfaces, the integral projection having at least one surface engaging a conveyor guide side rail to support the belt and prevent it from lifting as it rounds a turn.

7. The conveyor belt of claim 1, wherein a module at an outer edge of the belt comprises:

a) belt edge structure including an integral sidewall forming a belt edge surface;

b) an integral projection extending outwardly from the second module surface formed by the belt edge structure, the integral projection including a tab extending inwardly of the outer edge of the belt and being substantially parallel to the plane of the second surface, the tab engaging a conveyor wearstrip disposed beneath the belt to prevent the belt from lifting as it rounds a turn; and c) a guide extending outwardly from the second module surface substantially parallel to the integral projection and depending from a link end such that the holddown tab is disposed between the guide and the outer edge of the belt, the guide engaging the conveyor wearstrip at the inside of a turn.

8. A plastic belt module for a conveyor belt constructed of plastic belt modules interlinked by pivot rods into a sequence of adjacent hinged rows of modules for conveying product in a direction of travel that may include a curved path, the belt module comprising:

a) first and second module surfaces defining planes substantially parallel to the direction of travel;

b) an elongate element comprising a corrugated strip disposed across the width of the module transverse to the direction of travel and between the first and second module surfaces, the corrugated strip having opposing first and second walls forming a series of regularly spaced ridges and grooves across the width of the module;

c) a first plurality of link ends extending outwardly from the ridges on the first wall of the corrugated strip in the direction of travel;

d) a second plurality of link ends extending outwardly from the ridges on the opposing second wall of the corrugated strip in the opposite direction;

e) each link end including a leg portion extending from the ridges along the direction of travel and a distal portion forming an end of the link end, the distal portion including a chamfered surface intersecting the plane of the second surface, each link end having a transverse hole aligned with the holes of the link ends extending from the same wall of the corrugated strip;

f) the transverse holes of the second plurality of link ends being slotted in the direction of travel.

9. The plastic belt module of claim 8, wherein the elongate element is disposed substantially midway between the first and the second plurality of link ends and wherein the first and second walls of the corrugated strip form a series of arch-shaped recesses with the leg portions of consecutive link ends, the arch-shaped recesses being of sufficient transverse dimension to accommodate intercalated link ends of similar interlinked modules.

10. The plastic belt module of claim 9, wherein the arch-shaped recesses formed along the first wall of the corrugated strip overlap in the transverse direction the recesses formed along the second wall.

11. The plastic belt module of claim 8, wherein the chamfered surface at the distal portion of the link ends forms an obtuse angle with the second surface of the module.

12. The plastic belt module of claim 11, wherein the distal portion of the link ends further includes a second chamfered surface forming an equal obtuse angle with the first surface of the module.

13. An edge module for use at an outer edge of a modular plastic conveyor belt constructed of plastic belt modules interlinked by pivot rods into a sequence of adjacent hinged rows of modules for conveying product in a direction of travel that may include a curved path, the edge module comprising:

a) first and second module surfaces defining planes substantially parallel to the direction of travel;

b) an elongate element comprising a corrugated strip disposed across the width of the module transverse to the direction of travel and between the first and second module surfaces, the corrugated strip having opposing first and second walls forming a series of regularly spaced ridges and grooves across the width of the module;

c) a first plurality of link ends extending outwardly from the ridges on the first wall of the corrugated strip in the direction of travel;

d) a second plurality of link ends extending outwardly from the ridges on the opposing second wall of the corrugated strip in the opposite direction;

e) each link end including a leg portion extending from the ridges along the direction of travel and a distal portion forming an end of the link end, the distal portion including a chamfered surface intersecting the plane of the second surface, each link end having a transverse hole aligned with the holes of the link ends extending from the same wall of the corrugated strip;

f) the transverse holes of the second plurality of link ends being slotted in the direction of travel; and g) integral belt edge structure having an interior link end portion and an outer sidewall forming the outer edge of the module, the link end portion having a transverse hole aligned with the transverse holes of the first plurality of link ends of the module for journalling a pivot rod, the sidewall connected to the link end portion by transverse connecting structure forming a segmental cylindrical groove aligned with the transverse holes of the first plurality of link ends, the connecting structure including an occluding surface at the sidewall end of the groove for confining a headless pivot rod extending along the groove.

14. The edge module of claim 13, further comprising an integral projection extending transversely outwardly from the sidewall, the integral projection being symmetrical about a plane parallel to and midway between the planes defined by the first and second module surfaces.

15. The edge module of claim 13, further comprising first and second integral projections extending transversely outwardly from the sidewall, the projections being symmetrically disposed along the sidewall and spaced apart to form therebetween a longitudinal groove in the direction of belt travel, the longitudinal groove being positioned midway between the planes of the first module surface and the second module surface.

16. The edge module of claim 13, further comprising:

a) an integral projection extending outwardly from the second module surface formed by the belt edge structure, the integral projection including a tab extending inwardly of the outer edge of the belt and being substantially parallel to the plane of the second surface; and c) a guide extending outwardly from the second module surface substantially parallel to the integral projection and depending from a link end such that the tab is disposed between the guide and the outer edge of the belt.

* * * * *